United States Patent [19]

Grove

[11] Patent Number: 4,694,550

[45] Date of Patent: Sep. 22, 1987

[54] SNAP FASTENER TOOL

[76] Inventor: Jerry E. Grove, 3700 3-Mile Rd., Bay City, Mich. 48706

[21] Appl. No.: 877,170

[22] Filed: Jun. 23, 1986

[51] Int. Cl.[4] .............................................. B23P 19/04

[52] U.S. Cl. ...................................................... 29/267

[58] Field of Search ................... 254/15, 113, 119, 243, 254/244; 29/267, 243.56, 235, 270; 24/68 R

[56] References Cited

U.S. PATENT DOCUMENTS

| | | | |
|---|---|---|---|
| 418,172 | 12/1889 | Frike | 254/243 |
| 1,610,988 | 12/1926 | Yawn | 29/267 |
| 1,933,384 | 10/1933 | Moylan | 29/267 |
| 2,179,438 | 11/1939 | Stewart | 254/243 |

*Primary Examiner*—Robert C. Watson

*Attorney, Agent, or Firm*—Learman & McCulloch

[57] ABSTRACT

A snap fastener tool for use in applying boat covers, vehicle tops, etc., where mating snap fastener halves on a canvas or fabric cover and on a fixed frame must be brought into coupling alignment with each other. An elongate rigid handle is formed with a rearwardly facing shoulder projecting from one side of the handle near its front end for engagement with the fastener half on the cover and a jack arm is pivotally mounted on the handle intermediate its ends for engagement with the fastener half on the fixed frame and for pivotal movement into and out of rearwardly spaced opposed relationship with the shoulder. As the handle and jack lever are pivoted opposed, concave fastener seats on the shoulder and front end of the jack arm and engaging the fastener halves force the latter into alignment with each other and join them together.

9 Claims, 5 Drawing Figures

SNAP FASTENER TOOL

The present invention relates to a manually operable tool especially adapted to align and join two mating snap fastener halves, such as those used on a removable canvas boat cover or a removable fabric vehicle top, for example.

BACKGROUND OF THE INVENTION

As is well known to owners of automotive vehicles having removable canvas or plastic tops and boat owners who employ plastic or canvas cockpit covers held in place by snap fasteners, the tops or covers are designed so that the canvas or other material of which the cover is formed is tightly stretched when installed. When the top or cover is removed or unsnapped it normally tends to shrink as a consequence of which reinstallation of the cover, particularly the coupling of the last several snap fasteners, frequently requires considerable force to stretch the fabric enough to get the mating fastener halves aligned, combined with some manual dexterity to snap the halves together once alignment is achieved because the installer's fingers are between the fabric upon which one fastener half is mounted and the fixed structure upon which the mating fastener half is mounted.

The present invention is directed specifically to a manually operable tool which is capable of exerting sufficient force to draw the mating fastener halves into alignment with each other and which, in the same manipulation, can effect joining of the two fastener halves together.

SUMMARY OF THE INVENTION

A tool embodying the present invention includes an elongate rigid handle adapted to overlie a fastener half mounted adjacent one edge of a fabric or plastic cover. The handle is formed with a rearwardly facing shoulder or abutment projecting from one side of the handle near its forward end. The shoulder is formed with a concave recess or seat which may be placed in partially embracing engagement with an edge of the button. An elongate jack arm or lever is mounted on the handle by a pivot located intermediate the ends of the handle so that the jack arm can rock freely about the pivot, thereby enabling the free or distal end of the pick arm to move toward and away from the one side of the handle. The jack arm thus is capable of moving to a position substantially parallel to the handle with the free end of the arm in rearwardly spaced, opposed relationship with the shoulder on the handle. The free end of the jack arm is formed with a forwardly opening concave recess which may be placed in partially embracing engagement with one side of the base of a snap fastener element mounted on a fixed frame.

In operation, the jack arm is swung to a position in which the recess at the free end of the jack arm is seated against a fixed snap fastener element base, and the forward end of the handle is positioned so that the seat on the shoulder of the handle is in engagement with a button on the fabric cover. The rear end of the handle is then swung in such direction that the free end of the jack arm is caused to rock toward the handle. This rocking action draws the two fastener elements toward overlying alignment with each other and, by virtue of the leverage created by the geometry of the tool, considerable force can be applied, if necessary, to stretch the cover to achieve this alignment. When the parts of the fastener are aligned, continued movement of the handle of the tool in the same direction forces the cover fastener element to be seated on and joined to the base fastener element.

Other features of the invention will become apparent by reference to the following specification and the accompanying drawings.

THE DRAWINGS

THE PREFERRED EMBODIMENT

Figure 1:
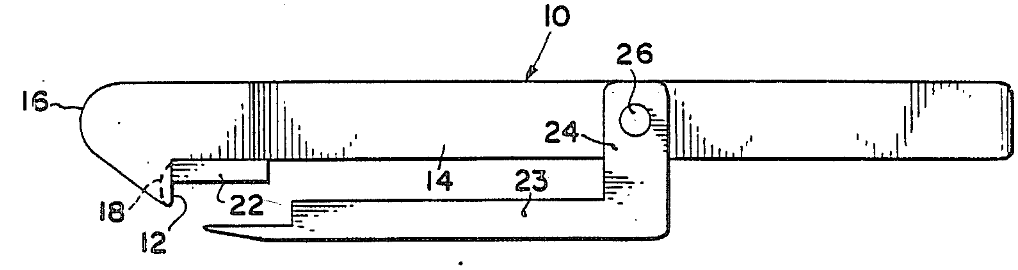
FIG. 1 is a side elevational view of a snap fastener tool embodying the present invention.
Figure 3:
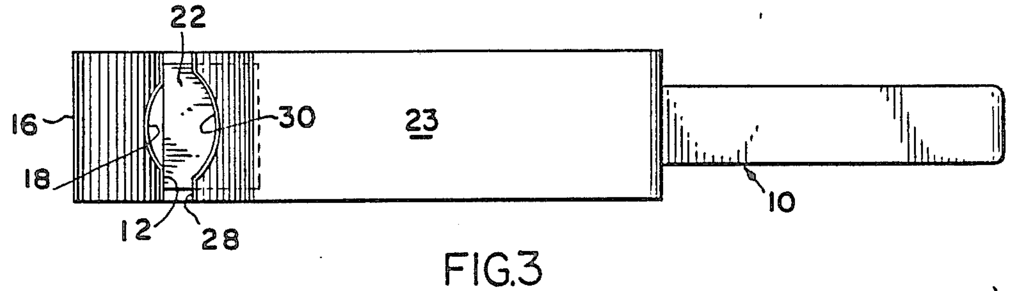
FIG. 3 is a bottom plan view of the tool of FIG. 1.
Figure 4:
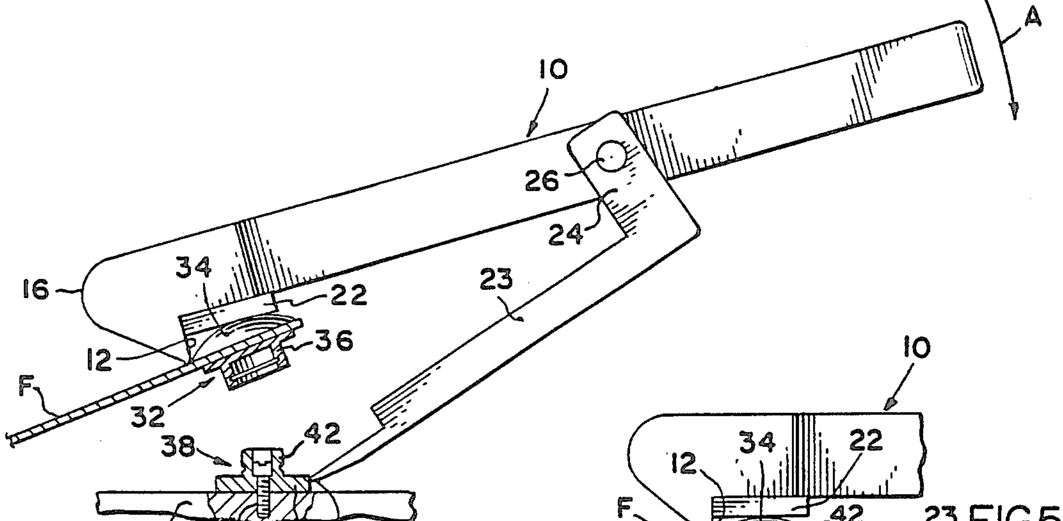
FIG. 4 is a side elevational view of the tool of FIG. 1 at an initial stage of its operation, with certain parts broken away or shown in section.

A snap fastener tool embodying the present invention includes an elongate, preferably metallic, rigid handle 10 undercut at its forward end to form a rearwardly facing shoulder or abutment 12 which, as is best shown in FIGS. 1 and 4, projects outwardly from one side 14 of handle 10 near the front end 16 of the handle. Shoulder 12, as is best shown in FIG. 3, is formed with a rearwardly facing concave recess 18. A metallic pad 22 of appropriate thickness is integral with or secured to the side 14 of handle 10 and extends a short distance rearwardly from shoulder 12.

Figure 2:
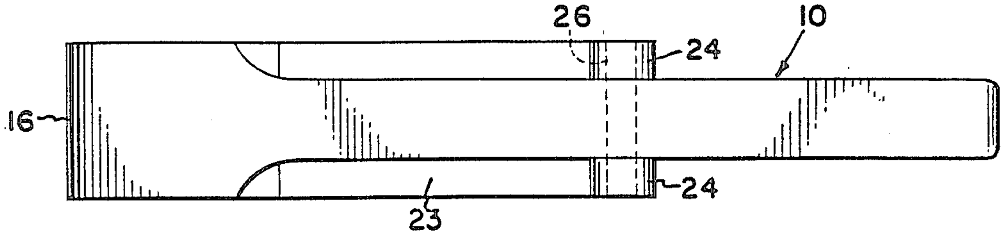
FIG. 2 is a top plan view of the tool of FIG. 1.

An elongate, rigid jack arm or lever 23 is formed at one end with a clevis 24 which, as is best shown in FIGS. 1 and 2, projects upwardly from the jack arm and straddles the handle 10. A pivot pin 26 passes through the handle 10 and the clevis and mounts the jack arm 23 on the handle for pivotal movement toward and away from the one side 14 of handle 10.

As is best shown in FIG. 3, the forward or free end 28 of jack arm 23 is formed with a forwardly facing concave recess 30. The length of the jack arm 23 is such that, in the position shown in FIG. 1, the free end 28 confronts the shoulder 12, but is rearwardly spaced therefrom.

Figure 5:
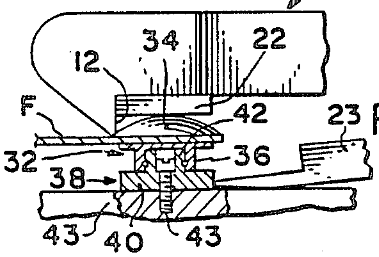
FIG. 5 is a detail side elevational view of the forward portion of the tool at the completion of a snap fastener coupling operation.

The tool is adapted for use with a typical snap fastener shown in FIGS. 4 and 5 as including a first snap fastener half 32 secured in known manner to a piece of fabric F near the fabric edge. The fastener half 32 typically includes a crowned button 34 exposed at one side of the fabric and an integral, coaxial socket-forming portion 36 projecting from the opposite side of the fabric F. The mating fastener half designated generally 38 includes an annular base 40 with a coaxial annular stud 42 projecting upwardly from the base and adapted to be accomodated with a snap fit within the socket of the mating fastener half 32. The fastener half 38 typically is fixed on a stationary frame member 43 by means of a screw 44 or the like.

The space between the shoulder 12 and the free end 28 of the jack arm 23 when the latter is substantially parallel to the handle 10 corresponds substantially to the width of the base 40 of the fastener half 38.

To use the tool of the present invention, the free end 28 of jack arm 23 is placed against the base of the stationary snap fastener half 38 with the annular edge of the base embraced by and seated in the concave recess 30 (FIG. 3) in the free end of the lever. The tool is then manually adjusted, as shown in FIG. 4, to a position in which the shoulder 12 of the handle 10 engages that side of the button 34 which is remote from the fastener half 38. The button will be accommodated in and embraced by the recess 18 at the rearwardly facing side of shoulder 12 and the pad 22 will overlie and bear against the top of button 34.

When the two fastener halves are engaged by the respective parts of the tool as illustrated in FIG. 4, handle 10 may be rocked downwardly, in the direction of the arrow A, from the position shown in FIG. 4, thus moving the pivot pin 26 downwardly in an arc having its center at the fixed fastener half 38. Such movement of handle 10 is accompanied by movement of the shoulder 12 downwardly and to the right, as viewed in FIG. 4, to apply a stretching force on fabric F and move the fastener 32 into coaxial, overlying alignment with the fastener element 38.

As the rocking movement of the handle 10 continues, the handle and the jack arm 23 will move relatively to one another and, after fastener elements 32 and 38 have been moved into coaxial, overlying alignment with each other, the pad 22 will press the two fastener elements into their assembled positions shown in FIG. 5.

Although only one embodiment of the invention has been described in detail, it will be apparent to those skilled in the art the disclosed embodiment may be modified. Therefore, the foregoing description is to be considered exemplary rather than limiting, and the true scope of the invention is that defined in the following claims.

What is claimed is:

1. A snap fastener tool for joining together a pair of mating fastener members secured respectively to a flexible cover and a fixed base, said tool comprising a handle having forward and rearward ends and being undercut at one end to form a shoulder facing the rearward end; a pad on said handle adjacent said shoulder which is adapted to overlie and bear on the fastener member secured to said cover; and a jack arm free at one end and pivoted at its other end to said handle between the ends of the latter for rocking movements of said one end toward and away from said handle, said jack arm being of such length that in one position thereof its one end confronts and is spaced rearwardly of said shoulder, said one end of said jack arm being adapted to seat against the fastener member secured to said base and said shoulder being adapted to seat against the fastener member secured to said cover with that portion of said handle rearward and adjacent said shoulder overlying the fastener member secured to said cover, whereby rocking movement of said handle about an arc having its center at said one end of said jack arm causes said fastener members to be drawn into overlying, axial alignment.

2. The tool according to claim 1 wherein said one end of said jack arm is configured to embrace the fastener member secured to said base.

3. The tool according to claim 1 wherein said shoulder is configured to embrace the fastener member secured to said cover.

4. The tool according to claim 1 wherein the length of said jack arm is such that the space between said one end thereof and said shoulder corresponds substantially to the width of the fastener half secured to said base.

5. A snap fastener tool for coupling to each other upper and lower mating snap fastener halves respectively mounted on a flexible member and on a fixed frame member, said tool comprising an elongate rigid lever having upper and lower walls, side walls and front and rear ends; means defining a rearwardly facing abutment projecting from the lower side of said lever adjacent the front end thereof for engaging said upper fastener half; an elongate, rigid jack arm mounted on said lever for pivotal movement toward and away from said lever about an axis generally perpendicular to said lever sides and generally normal to the longitudinal extent of said lever; said abutment comprising a downwardly extending surface extending generally parallel to a vertical plane through said axis and said jack arm having a front end vertical edge surface spaced a predetermined distance from said axis and downwardly offset therefrom such that, when it is swung upwardly toward said lever to a position in which its front vertical edge surface is substantially parallel with said abutment surface, said front end edge surface of the jack arm is spaced rearwardly of and downwardly from said abutment surface, said abutment and front end edge surface of said jack arm being engageable with the upper and lower fastener halves respectively on said flexible member and said frame member, respectively, and operable when so engaged with the respective fastener halves to relatively pivot to effect coaxial alignment of said fastener halves and then relative vertical coupling of said fastener halves.

6. The tool defined in claim 5 wherein said abutment surface and said front end edge surface of the jack comprise curvilinearly recessed surfaces for receiving said snap fastener halves therein.

7. The tool defined in claim 5 wherein said jack arm is angular in configuration.

8. The tool defined in claim 5 wherein the length of said jack arm is less than the distance from said axis to said abutment.

9. The tool defined in claim 5 including means on said lever for axially forcing the fastener half on said flexible member toward coupling engagement with the fastener half on said frame member.

* * * * *